3,822,332
PROCESS FOR THE PRODUCTION OF AMORPHOUS TRANSPARENT POLYETHYLENE MOULDINGS BY THE COMBINED INJECTION AND BLOW MOULDING TECHNIQUE
Josef Hrach and Franz Breitenfellner, Kufstein, Austria, assignors to Ciba-Geigy A.G., Basel, Switzerland
Continuation-in-part of abandoned application Ser. No. 169,696, Aug. 6, 1971. This application Aug. 24, 1971, Ser. No. 174,487
Claims priority, application Austria, Aug. 7, 1970, 7,245/70, 7,246/70
Int. Cl. B29c 17/07
U.S. Cl. 264—97                7 Claims

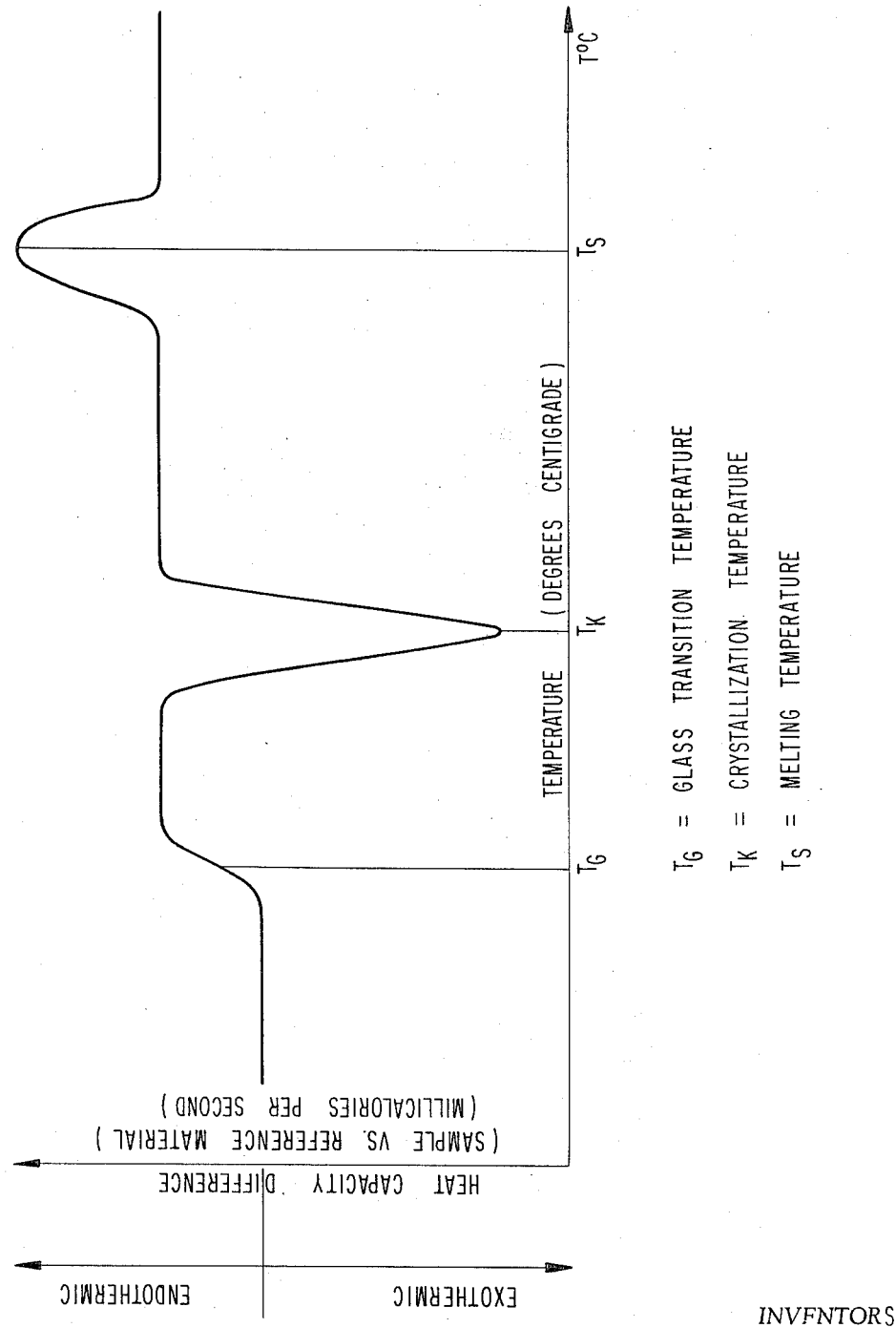

ABSTRACT OF THE DISCLOSURE

The production of transparent amorphous articles from polyethylene terephthalates by using a polyester of an intrinsic viscosity of at least 0.7 dl./g. and a crystallisation temperature of at least 150° C.

RELATED APPLICATION

This application is a continuation-in-part of application Ser. No. 169,696 and filed on Aug. 6, 1971, now abandoned.

This invention relates to a process for the production of transparent, amorphous articles, in particular hollow articles, with polyester moulding materials by means of a combined injection and blow moulding technique. This technique has long been in use for producing hollow articles from polymers, such as polyethylene, polyvinylchloride and polystyrene.

It has been found, and this forms part of the present invention, that moulded, in particular hollow moulded, articles showing high transparency and excellent service properties can be produced by employing (in the stated moulding technique) polyethylene terephthalates whose acid component consists of at least 80 mol percent of terephthalic acid radicals, whose diol component consists of at least 80 mol percent of ethylene glycol radicals and which have an intrinsic viscosity of at least 0.70 dl./g., preferably at least 0.85 dl./g., and a crystallization temperature of at least 150° C., preferably at least 160° C. Any type of moulding machine can be used with single or multi-cavity moulds split usually parallel to the longitudinal axis of the machine in which a premoulding shaped like a beaker or a test tube is formed.

The crystallization temperature is understood to be the temperature of the maximum rate of crystallization, which is a measure of the crystallization power of the polyester. The higher the crystallization temperature, the lower is the crystallization power, i.e. crystallization of the polyester is proportionately poorer, slower and requires a proportionately higher temperature. The values for the crystallization, glass transition and melting temperatures given herein were determined with the Perkin-Elmer Differential Calorimeter DSC-IB. A sample of the polyester is melted, tempered for 5 minutes at 300° C., chilled to 0°–20° C. and heated up at the rate of 16° C. a minute. Differences in heat capacities between that of the sample and that of an inert reference material (e.g. aluminum) are plotted against temperature in degrees centigrades. The inflexion point on the curve (when the difference between the heat capacity of the sample and that of the reference material suddenly increases) is quoted as the glass transition temperature of the investigated polymer. The crystallization temperature is defined by the exothermic peak and the melting temperature by the endothermic peak in the thermogram. Further clarification will be found in the attached schematic diagram. The sprue of the premoulding lies usually in the centre of the base of the final hollow article. The blow mandrel is simultaneously the core of the injection mould for the premoulding. The neck of the final moulding is formed by injection moulding alone whereas the body is first injected as a premoulding and then in a second step detached from the core and expanded until it touches the inside of the wall of the blow mould. Shortly after the plasticized moulding material has been injected, the mould is opened and the mandrel (with the premoulding) is transferred by hand or mechanically to the blow mould. Through a valve in the mandrel air is injected which detaches the plasticized moulding from the mandrel and expands it to the final shape. In some moulding machines the mandrel is fixed, the injection mould is removed and the mandrel is enclosed by the blow mould. The temperature of the mandrel and the injection mould is set at 60°–100° C., preferably 65°–85° C., and the blow mould is set at a temperature below 50° C. Thus the premoulding is blow moulded at a temperature approximating the glass transition temperature (the glass transition temperature of polyethylene terephthalate, for instance, is about 75° C.); on contact with the cooled mould wall the moulding cools and sets in the final form.

The crystallization temperature is a measure of the crystallization power of polyesters: the higher the crystallization temperature, the lower the crystallizing power, i.e. the polyester crystallizes more slowly at higher temperatures and with inferior results. In order to produce transparent moulded articles which retain their transparency under normal environmental conditions and temperatures up to about 50°–60° C., polyesters with low crystallization power, i.e. with a high crystallization temperature, have to be used. Polyesters with a minimum crystallization temperature of 150° C., or preferably 160° C., are suitable for this purpose. They can be obtained by using in their production (transesterification or esterification and condensation polymerization) catalyst combinations containing one or more of the metals magnesium, zinc, cobalt and manganese. Metals of the group lithium, sodium, calcium, barium and strontium should be absent or present only in minute amounts as they promote crystallization. Other metals, metal alloys and metal compounds can be employed as catalysts in condensation polymerization, for instance antimony, lead, germanium and titanium. Processes for the production of polyesters under these conditions are described in the literature, for example British Pat. 1,192,820.

The catalysts are employed in amounts of 0.001–0.5 weight percent, preferably 0.01–0.1 weight percent, relative to the metal and the acid component. With these catalysts polyesters having an intrinsic viscosity of at least 0.70 dl./g. are produced by direct esterification or transesterification and condensation polymerization. In direct esterification the acid and diol components are reacted at temperatures ranging from 120° C. to 250° C. and at a pressure preferably greater than 1 atmosphere. Transesterification is carried out in the same temperature range without excess pressure. Both reactions yield the essentially monomeric diol diesters of the dicarboxylic acid components. The end-point of the reaction is indicated in direct esterification and transesterification, respectively, by the separation of the theoretical amount of water or of low molecular alcohol. The residual diol component, which is normally employed in stoichiometric excess, is distilled at temperatures above 250° C., then a vacuum pressure of less than 1 Torr. is applied and condensation polymerization carried out at temperatures above 250° C. Alternatively, the mixture can be reacted to a predetermined degree of polymerisation and allowed to cool, the product comminuted and polymerized further in the solid phase, i.e. at temperatures below the melting point of the polyester.

All the catalysts used can be added prior to direct esterification or transesterification or, alternatively, the direct or transesterification catalysts containing magnesium, zinc, cobalt, manganese, lead, tin, antimony or titanium can be added to the starting mixture of the acid and diol components, while the polymerization catalysts containing antimony, titanium or germanium are added on completion of a direct or transesterification.

This invention relates further to the moulded articles produced by the aforedescribed process.

When polyethylene terephthalate is used, the process of this invention is carried out as follows. Dimethyl terephthalate and ethylene glycol are transesterified in known manner in the presence of catalysts, such as magnesium, zinc, cobalt and/or manganese, with subsequent condensation polymerization, again in known manner, in the presence of freely selected polymerization catalysts, such as antimony, lead, germanium and titanium, until the desired intrinsic viscosity is reached. The polyester melt is extruded from the reaction vessel in ribbon form, granulated and dried to a moisture content of less than 0.01 weight percent. A suitable polyethylene terephthalate of this type is fed into an injection and blow moulding machine of standard design set at an ascending scale of temperatures starting from the filling hopper; the compartment adjacent the hopper has a temperature close to the melting point of the granules, the following compartments have higher temperatures and the ejection compartment has a temperature 20°–60° C. higher than the melting point. The mandrel and the injection mould are maintained at 60°–100° C., preferably water cooled. The cooling time of the premoulding in the injection mould normally depends on its wall thickness, and likewise the residence time of the blown moulding in the blow mould.

In place of polyethylene terephthalates, copolyesters produced from aromatic dicarboxylic acids aliphatic and/or cyclic diols can be moulded by the process described above. The mandrel and the injection mould are set at a temperature roughly equal ($\mp 10°$ C.) to the freezing temperature of the copolyester or up to 50° C. higher than it, while the blow mould is maintained at a temperature at least 20° C. below the freezing temperature of the copolyester. Suitable aromatic dicarboxylic acids include terephthalic, isophthalic, phthalic, 1,4-naphthalenedicarboxylic, 2,5-naphthalenedicarboxylic and 2,6-naphthalenedicarboxylic acid, substituted terephthalic acids, such as methylterephthalic and dimethylterephthalic acids, and substituted isophthalic acids, such as 5-alkyl-iso-phthalic acid. The suitable diols include ethylene glycol, propanediol-1,3, propanediol-1,2, butanediol-1,4, hexanediol-1,6, trimethylhexanediol-1,6, 2,2'-dimethyl-bis - (4' - hydroxyethoxyphenyl)-propane.

In order to produce moulded goods which have superior service properties, notably tensile strength and stiffness, giving high shape and dimensional stability at temperatures to 50–60° C. as defined for this invention, the glass transition temperature or, as it is also termed, the second-order transition point of the copolyester must be at least 60° C., preferably at least 70° C. The copolyester must therefore be formulated to have a chemical composition meeting this requirement. Especially suitable are copolyesters whose molecular structure contains a sufficient number of stiffening members, in particular aromatic nuclei, preferably in 1,4-substitution. Examples are copolyesters whose acid component consists of more than 80 mol. percent of terephthalic acid and whose diol component consists of approximately 80 mol. percent of ethylene glycol. Copolyesters specially suitable for use in the present process are those produced from terephthalic acid, 2–20 mol. percent isophthalic acid and ethylene glycol and, those from terephthalic acid, ethylene glycol and 2–20, more especially 5–15, mol. percent 2,2'-dimethyl-bis-(4'-hydroxyethoxyphenyl) - propane or 2–15, more especially 5–10, mol. percent of trimethylhexanediol-1,6. In the said process copolyesters with an intrinsic viscosity of at least 0.70 dl./g., preferably at least 0.85 dl./g., are used, this being necessary to obtain tough, impact resistant moulded articles. Their minimum crystallization temperature is 160° C. or preferably 180° C., and may be one which is not measurable by the method described above.

The intrinsic viscosity is determined at 30° C. with a solution of 1 g. of the polyester in 100 ml. of a mixture of equal parts by weight of phenol and tetrachloroethane.

For processing the aforedescribed copolyesters by the combined injection and blow moulding process, the mandrel and injection mould are set roughly equal ($\mp 10°$ C.) to the glass transition temperature or to 50° C. above it, and the blow mould is set at a temperature not less than 20° C. below the glass transition temperature. Under these conditions hollow articles are obtained which are so highly transparent as to be almost as clear as glass; they retain their transparency under normal environmental conditions and moderately high ambient temperatures (to 50–60° C.) over a long period of time. When copolyesters with a minimum crystallization temperature of 180° C., or preferably those which show no crystallizing temperature in the aforementioned method of determination, are employed, the transparent moulded articles produced show no haziness, even at temperatures close to the melting point.

Copolyesters for use in the present process are produced in known manner by direct or transesterification followed by condensation polymerization, using catalyst combinations containing one or more of the metals: magnesium, zinc, cobalt and manganese. Metals of the group: lithium, sodium, calcium, barium and strontium should be absent or present only in minute amounts, as they promote crystallization. For the condensation polymerization step other metals, metal alloys or metal compounds can be employed, such as antimony, lead, germanium and titanium. Processes of this type for the production of copolyesters are described in the literature, for example in British Pat. 2,965,613.

When copolyesters are employed, the process of this invention is carried out as follows. A mixture of dialkyl esters of one or more aromatic and/or aliphatic dicarboxylic acids and/or alkylesters of one or more hydroxycarboxylic acids and one or more diols is transesterified in known manner in the presence of transesterification catalysts containing magnesium, zinc, cobalt and/or manganese, and the product is condensation polymerized in the normal way in the presence of known catalysts for this purpose, such as those containing antimony, lead, germanium and titanium, until the desired intrinsic viscosity is attained. As copolyesters are involved, at least three components of the aforenamed group of compounds must be present, of which at least one must be a compound of a dicarboxylic acid or of its alkylester. The polyester melt is extruded from the reaction vessel in ribbon form, granulated and dried to a moisture content of less than 0.01 weight percent. A copolyester of this type is fed into an injection and blow moulding machine of standard design, set preferably at an ascending scale of temperatures from the filling hopper. The ejection section of the barrel has a temperature preferably 30°–80° C. above the melting point of the copolyester. The mandrel and the injection mould are set roughly equal ($\mp 10°$ C.) to the glass transition temperature or up to 50° C. above it, and the blow mould is set at least 20° C. below the glass transition temperature. The blow mould is preferably water cooled. The wall thickness of the premoulding normally determines the cooling time in the injection mould, and likewise its residence time in the blow mould.

The predominantly hollow moulded articles thus produced are so highly transparent as to be almost as clear as glass, and they retain this transparency at temperatures approaching the melting point. They have notably good service properties including tensile strength, surface hardness, stability to fats, oils and many other chemicals, and low water absorptivity. In comparison with the plastics commonly used for this category of articles, such as polyethylene, polystyrene and polyvinyl chloride, they combine excellent toughness with stiffness even at low temperatures, show considerably less permeability by gases, odorous and aromatic substances, and higher light and weathering resistance. A special merit is that they are free from plasticizers and similar additives, which makes them acceptable for moulded food and cosmetic containers.

The following Examples illustrate the invention without limiting its scope.

EXAMPLE 1

A mixture of 200 parts of terephthalic acid dimethylester and 160 parts of ethylene glycol is set for reaction with 0.1 part of a pulverized alloy of 20 weight percent zinc, 40 weight percent lead and 40 weight percent antimony, previously sieved so that the maximum particle size is 25 microns. The mixture is reacted with heating and stirring in the absence of atmospheric oxygen. Distillation of the methanol and ethylene glycol takes place at temperatures to 250° C. and is complete in 2 hours. The reaction mixture is then passed through a fine mesh-size filter into the vessel for condensation polymerization. In this it is reacted for 3 hours at 275° C. and a vacuum pressure of 0.3–0.5 Torr. The polyester melt is driven out of the vessel with nitrogen in ribbon form, and on cooling is converted into granules. These are dried in a vacuum tumbler drier at about 120° C. to a moisture content of less than 0.01 weight percent. The intrinsic viscosity of this polyester is 0.79 dl./g. and its crystallization temperature is 166° C.

The granules are metered into a standard type injection and blow moulding machine, which is adjusted to 260° C. in the entry compartment of the barrel, 270° C. in the middle compartment and 290° C. in the ejection compartment. The injection mould and the mandrel are maintained at 75° C. The blow mould is water cooled and is fitted with a mandrel of 20 mm. diameter, on which bottles are formed with the dimensions: external diameter 35 mm., neck diameter 23 mm., height 83 mm., wall thickness of the blow moulded body 0.9 mm. The cooling time of the premoulding in the injection mould is 10 seconds, its residence time in the blow mould 15 seconds. The bottles thus produced are highly transparent and have outstandingly good service properties, with notably high tensile strength, stiffness and toughness, even at low temperatures, excellent stability to light and weathering, high resistance to oils, fats and many other chemicals, and low permeability by gases, odorous and aromatic substances. Their permeability by air, oxygen and hydrogen is considerably lower than that of articles made from standard moulding materials, such as polyethylene, polystyrene and polyvinyl chloride.

EXAMPLE 2

A mixture of 139 parts of terephthalic acid dimethyl ester, 105.5 parts of ethylene glycol and 12.3 parts of bis-phenol-A-diglycol ether is set for reaction with 0.03 part of calcium and 0.075 part of a finely pulverized alloy of 60 weight percent antimony and 30 weight percent lead. The mixture is reacted with heating and stirring in the absence of atmospheric oxygen. Distillation of the methanol and ethylene glycol takes place at temperatures up to about 200° C. and is complete in 4 hours. Towards the end of the reaction 9.6 parts of iso-phthalic acid and 0.05 part of triphenyl phosphite are added. The transesterification mixture is then run through a fine mesh-size filter into the vessel for condensation polymerization, where the temperature is increased and vacuum applied. Condensation polymerization is accomplished in 3½ hours at 275° C. With the aid of nitrogen the copolyester melt is driven out of the vessel in ribbon form; on cooling, the ribbons are converted into granules, which are dried in a vacuum tumbler drier at about 120° C. to a moisture content of less than 0.01 weight percent. The intrinsic viscosity of this copolyester is 0.78 dl./g., the melting point, 226° C.; and the glass transition temperature, 73° C.; the crystallization temperature is not measurable.

The granules are charged into an injection and blow moulding machine of standard design set at 230° C., 250° C. and 290° C., respectively, in the entry, middle and ejection sections of the barrel. The injection mould and the mandrel are at 70° C. The blow mould is water cooled and is shaped as in Example 1. The cooling time of the premoulding in the injection mould is 15 seconds, the moulding time in the blow mould is 15 seconds. The moulded articles thus produced have comparable properties to those of Example 1.

EXAMPLE 3

A mixture of 1600 parts of terephthalic acid dimethylester, 880 parts of ethylene glycol and 131 parts of 2,2-dimethyl - bis - (4'-hydroxyethoxyphenyl)-propane is set with 0.43 part of zinc acetate and 0.58 part of antimony trioxide and reacted with heating and stirring in the absence of atmospheric oxygen. After 4 hours at temperatures to 220° C., distillation of methanol and ethylene glycol is complete. The transesterification mixture is transferred through a filter into a vessel for condensation polymerization, where the temperature is increased and vacuum applied. Stirring is continued for 2½ hours at 275° C. and a vacuum pressure of 0.5–0.7 Torr. The copolyester melt is extruded with nitrogen as ribbons, which are cooled and granulated. The granules are dried in a vacuum tumbler drier at about 120° C. to a moisture content of less than 0.01 weight percent. The intrinsic viscosity of the copolyester is 0.85 dl/g. Using the aforementioned differential calorimeter and method, the following values are obtained: melting point 243° C., glass transition temperature 76° C., crystallization temperature 178° C.

The granules are charged into a standard type injection and blow moulding machine set at 250° C. in the entry, 270° C. in the middle and 290° C. in the ejection compartment of the barrel. The injection mould and mandrel are maintained at 70° C. The blow mould is water cooled and shaped as in Example 1. The cooling time of the premoulding in the injection mould is 15 seconds; the moulding time in the blow mould 20 seconds. The bottles made under these conditions are as clear as glass and have very good service properties, including tensile strength, toughness, stiffness, light and weathering resistance, stability to oils, fats and many other chemicals, and low permeability by gases, odorous and aromatic substances.

EXAMPLE 4

A mixture of 1600 parts of terephthalic acid dimethyl ester, 880 parts of ethylene glycol and 262 parts of 2,2'-dimethyl-bis-(4'-hydroxyethoxyphenyl)-propane is set for reaction with 0.128 part of finely pulverized zinc, 1.12 parts of a finely pulverized alloy of 70 weight percent antimony and 30 weight percent lead, and 0.64 part of triphenyl phosphite. It is reacted with heating and stirring in the absence of atmospheric oxygen and with distillation of the methanol and ethylene glycol, which is complete after 4 hours at temperatures to about 220° C. Subsequently the mixture is passed through a filter of fine mesh size into a vessel for condensation polymerization, where its temperature is increased and vacuum applied. Polymerization is complete in 3½ hours at 275° C., whereupon the copolyester melt is extruded with the aid of nitrogen in ribbon form. On cooling, the ribbons are converted into granules which are dried in a vacuum tumbler drier at about 120° C. to a moisture content of less than 0.01 weight percent. The intrinsic viscosity of this polyester is 0.78 dl./g. Measured with the differential calorimeter by the method referred to above, its melting point is 227° C. and the glass transition temperature, 76° C.; the crystallization temperature is not measurable.

This granulated copolyester is processed by the injection-blow moulding technique as described in Example 3. It forms transparent hollow articles which remain as clear as glass even in the vicinity of the melting point and have comparably good service properties.

EXAMPLE 5

A mixture of 200 parts of terephthalic acid dimethylester, 156 parts of ethylene glycol and 8.2 parts (5 mol. percent relative to the terephthalic acid dimethylester) of a mixture of 30 weight percent 2,2,4- and 70 weight percent 2,4,4-trimethylhexanediol-(1,6) is set with 0.335 part of $Zn(CH_3COO)_2H_2O$. It is reacted with heating and stirring in the absence of atmospheric oxygen and moisture and with distillation of methanol and glycol, which is accomplished in 2 hours at temperatures to 250° C. Subsequently stirring is continued for 1½ hours at 275° C. and a vacuum pressure of 0.45–0.50 Torr. The melt is then driven out of the vessel with nitrogen in ribbon form; after cooling it granulated. The granules are dried in a vacuum tumbler drier at about 120° C. to a moisture content of less than 0.01 weight percent. The resulting copolyester has an intrinsic viscosity of 0.70 dl./g.; its melting point is 245° C., its glass transition temperature, 71° C.; and its crystallization temperature, 150° C.

The granulated copolyester is processed in a moulding machine of standard design. The barrel temperatures are 240° C., 260° C. and 280° C. for the entry, middle and injection compartments, respectively. while the injection mould and the mandrel are at 80° C. The blow mould is cooled with water and is shaped as in Example 1. The cooling time of the premoulding in the injection mould is 15 seconds; the residence time in the blow mould, 15 seconds. The hollow articles obtained are transparent even at temperatures close to the melting point and have comparably good service properties to those produced by the other procedures described.

Having thus disclosed the invention what we claim is:

1. A process for producing an amorphous transparent molded article from polymer and which comprises combined injection and blow molding of the polymer, the combined injection and blow molding being effected in an injection and blow molding machine with (a) an injection mold having a core and (b) a blow mold, the core being a mandrel for the blow mold, the molding comprising injection molding the polymer onto said core and then detaching it therefrom and expanding it until it touches said blow mold, and wherein the polymer is polyester having an acid component with at least 80 mol percent of terephthalic acid radicals, having a diol component with at least 80 mol percent of ethylene glycol radicals, having an intrinsic viscosity of at least 0.70 dl./g., having a crystallizing temperature of at least 150° C. and having a glass transition temperature; the process further comprising setting the mandrel and the injection mold at a temperature which is within a range from about the glass transition temperature of the polyester to a temperature which is about 50° C. in excess thereof and setting the blow mold at a temperature which is at least 20° C. below the glass transition temperature of the polyester.

2. A process according to claim 1 wherein the polyester is polyethylene terephthalate having a crystallizing temperature of at least 160° C.

3. A process according to claim 1 which comprises setting the mandrel and the injection mold at a temperature in the range of from about 60° to 100° C., and setting the blow mold at a temperature which is at most 50° C.

4. A process according to claim 3 which comprises setting the mandrel and the injection mold at a temperature in the range of from about 65° to 85° C.

5. A process according to claim 1 wherein the polyester is that of terephthalic acid, ethylene glycol and from 2 to 10 mol percent of 2,2-dimethyl-bis-(4'-hydroxyethoxyphenyl)propane.

6. A process according to claim 1 wherein the polyester is that of terephthalic acid, ethylene glycol and from 5 to 10 mol percent of 2,2-dimethyl-bis-(4'-hydroxyethoxyphenyl)propane.

7. A process according to claim 1 wherein the glass transition temperature of the polyester is at least 60° C.

References Cited
UNITED STATES PATENTS

| | | | |
|---|---|---|---|
| 3,470,282 | 9/1969 | Scalora | 264—97 |
| 3,479,318 | 11/1969 | Jackson et al. | 260—40 |
| 3,516,957 | 6/1970 | Gray et al. | 260—40 X |
| 3,337,666 | 8/1967 | Wilkins | 264—97 |
| 3,429,854 | 2/1969 | Siggel | 264—92 X |
| 3,733,309 | 5/1973 | Wyeth et al. | 264—98 X |
| 3,745,150 | 7/1973 | Corsover | 264—98 X |

ROBERT F. WHITE, Primary Examiner

T. P. PAVELKO, Assistant Examiner

U.S. Cl. X.R.

260—75 T; 264—DIG. 50, DIG. 64